US009122519B1

(12) United States Patent
Andres et al.

(10) Patent No.: US 9,122,519 B1
(45) Date of Patent: Sep. 1, 2015

(54) GOVERNOR FOR ELIMINATION OF REPETITIVE REQUESTS

(75) Inventors: Lillian K. Andres, Trenton, NJ (US); Valerie Underwood, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1146 days.

(21) Appl. No.: 12/046,710

(22) Filed: Mar. 12, 2008

(51) Int. Cl.
*G06F 9/48* (2006.01)
*G06Q 30/06* (2012.01)
*H04L 29/08* (2006.01)
*H04L 29/06* (2006.01)

(52) U.S. Cl.
CPC .......... *G06F 9/4843* (2013.01); *G06Q 30/0603* (2013.01); *H04L 67/02* (2013.01); *H04L 67/142* (2013.01); *H04L 67/42* (2013.01)

(58) Field of Classification Search
USPC ............... 709/203, 225, 226, 237; 705/14.23, 705/14.51
See application file for complete search history.

(56) References Cited

U.S. PATENT DOCUMENTS

| 4,947,346 | A | | 8/1990 | Kamiya | |
|---|---|---|---|---|---|
| 5,361,390 | A | * | 11/1994 | Heyen et al. | 718/102 |
| 5,721,825 | A | * | 2/1998 | Lawson et al. | 709/203 |
| 6,070,184 | A | * | 5/2000 | Blount et al. | 709/200 |
| 6,185,613 | B1 | * | 2/2001 | Lawson et al. | 709/224 |
| 6,753,869 | B2 | * | 6/2004 | Andres et al. | 345/531 |
| 6,920,489 | B1 | * | 7/2005 | Yamamoto et al. | 709/219 |
| 6,925,459 | B2 | * | 8/2005 | Cornell et al. | 1/1 |
| 7,092,982 | B2 | * | 8/2006 | Fujiwara et al. | 709/200 |
| 7,315,830 | B1 | * | 1/2008 | Wirtz et al. | 705/14.1 |
| 7,484,087 | B2 | * | 1/2009 | Doddington | 713/150 |
| 7,590,567 | B2 | * | 9/2009 | Hopson et al. | 705/26.81 |
| 7,610,043 | B2 | * | 10/2009 | Bae | 455/412.2 |
| 2002/0042830 | A1 | * | 4/2002 | Bose et al. | 709/230 |
| 2002/0091615 | A1 | * | 7/2002 | Salvani | 705/37 |
| 2003/0126229 | A1 | * | 7/2003 | Kantor et al. | 709/217 |
| 2003/0156547 | A1 | * | 8/2003 | Peleg | 370/252 |
| 2003/0158960 | A1 | * | 8/2003 | Engberg | 709/237 |
| 2006/0224752 | A1 | * | 10/2006 | Parekh | 709/230 |
| 2006/0230152 | A1 | * | 10/2006 | Matsushima | 709/226 |
| 2007/0088628 | A1 | * | 4/2007 | Hopson et al. | 705/27 |
| 2007/0128899 | A1 | * | 6/2007 | Mayer | 439/152 |
| 2007/0286097 | A1 | * | 12/2007 | Davies | 370/255 |
| 2008/0007779 | A1 | * | 1/2008 | Van Gennip et al. | 358/1.15 |
| 2008/0021918 | A1 | * | 1/2008 | Rao | 707/102 |
| 2008/0115193 | A1 | * | 5/2008 | Prax et al. | 726/2 |
| 2008/0136605 | A1 | * | 6/2008 | Hunt et al. | 340/286.02 |
| 2009/0210404 | A1 | * | 8/2009 | Wilson | 707/5 |
| 2009/0217097 | A1 | * | 8/2009 | Laperi et al. | 714/37 |
| 2009/0234952 | A1 | * | 9/2009 | Wu | 709/226 |
| 2010/0011074 | A1 | * | 1/2010 | Billingsley et al. | 709/206 |

* cited by examiner

*Primary Examiner* — Backhean Tiv
(74) *Attorney, Agent, or Firm* — Howard IP Law Group, PC

(57) ABSTRACT

A browser invokes a program from a server. The server responds with a web page and ancillary logic. The browser displays the web page and loads the logic into memory. The ancillary logic includes a command set, a status indicator for each command type, and a set of command type governors. When a command is initiated at the browser, the appropriate governor observes the status, and deletes the command if the status is "not complete" or passes the command for transmission to the server if the status is "completed." This prevents the transmission of repeated or redundant commands to the server.

23 Claims, 4 Drawing Sheets

GOVERNOR FOR ELIMINATION OF REPETITIVE REQUESTS

BACKGROUND OF THE INVENTION

When a computer with a browser is connected as a client to a server by way of the internet, the server ordinarily provides pages or screens on request, together with the logic required to generate and process the screen image. A command is given at the browser-enabled computing device or user terminal, either as a keystroke or as a mouse click. Many, but not all, of these commands or requests are sent to the server. Most commonly, the server and browser-enabled computing device are remote from each other, and the communication is by way of the Internet. The server generates a response, which may be a new page, fill in a table on the current page, or the like. The new page or information is displayed by the browser.

Repetitive commands may occur, either because of some mechanical difficulty such as an object lying on a keypad or because of an impatient user. These repetitive commands are second or later commands that request actions of the server which have not yet been fulfilled the first time by the server.

The result of repetitive requests is the possibility of at least slowing the operation of the server as it attempts to handle the requests. This in turn leads to more commands occurring during the delay. It also results in the possibility of "hanging" or stalling (crashing) the server operation. Another problem with repetitive requests is that the user may lose track of the sequence of commands that has been entered, and may therefore not be aware of the end result of the sequence of commands already entered.

A disadvantageous effect of server response to repetitive requests is that, if many requests of the same sort are commanded in a short period of time, the server will process those requests in sequence, so that the requested actions may occur repeatedly after the commands are no longer being given.

Improved control is desired over commands sent from a browser to a server.

SUMMARY OF THE INVENTION

A method according to an aspect of the invention is for reducing the repetition of server actions in response to repeated identical commands from a browser-enabled computing apparatus communicating with the server. The method comprises the step of providing a server apparatus identified on the Internet with a universal resource locator address, the server including a server processor and a server memory, which server memory is preloaded with at least one user program and accessory logic therefore. The accessory logic (a) defines a command data element set or first logic element including plural command names, command invocation processing associated with each of the command names, and "not complete" and "completed" status attributes, (b) defines a second logic element for setting the "not complete" status attribute in response to the sending of a command, (c) defines a third logic element for clearing the "not complete" status of each of the status attributes to "completed" in response to a "completed" message, and (d) defines a plurality of governors, each of which, for a given command name in the command data element, determines if its status is "not complete" or "completed," and if its status is "not complete," deleting the given command, and if its status is "completed," sending the given command. The method also includes the provision of a browser-enabled computing apparatus including a processor, a memory, a data entry device, and a display device. The server is accessed from the browser-enable computer apparatus by way of the universal resource locator and the Internet, and the user program at the server apparatus is invoked. At the server, in response to being accessed by the browser-enabled computing apparatus and having the user program invoked, the server processor is used to access the user program and the accessory logic from server memory. Using the server processor, a page associated with the user program is transmitted to the browser-enabled computing device by way of the Internet, together with the accessory logic and an initial clear value. At the browser-enabled computing device, the computing device processor is used to load the page and the auxiliary logic into browser memory, and to display the page on the display device. Using the data entry device, one of the commands from among the command names is generated, and the one of the commands is applied to the processor of the browser-enabled computing device, which invokes the command invocation processing. In response to the one of the commands applied to the processor of the browser-enabled computing device, the current "not complete" or "complete" status of the command is accessed from the memory of the browser-enabled computing device. The corresponding one of the governors is invoked by the computer processor to delete the one command if its status is "not complete," and to send the one command to the server if its status is "completed."

According to another aspect of the invention, the server memory is loaded with a further logic element associated with the accessory logic. The further logic element responds to the sending of a response from the server to the browser-enabled computing device in response to receipt by the server of one of the named commands. The response is the sending of a "completed" message to the browser-enabled computing device.

DESCRIPTION OF THE INVENTION

Figure 1:
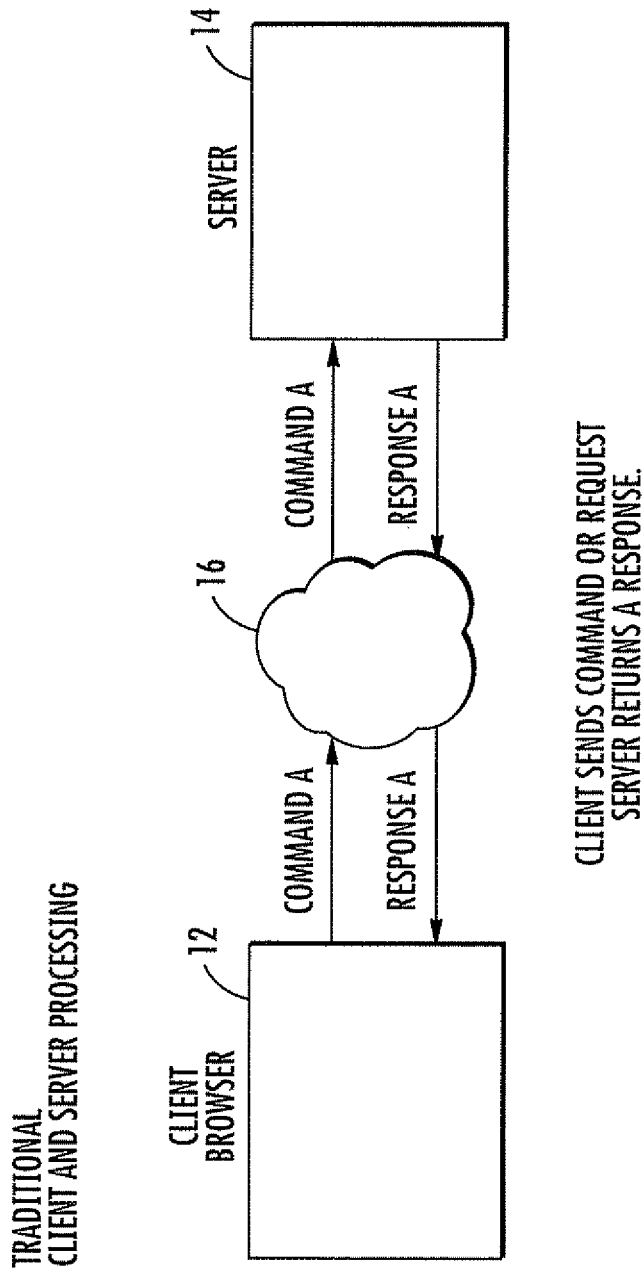
FIG. 1 is a simplified diagram illustrating a possible context in which a method according to the invention is practiced, including a browser-enabled user terminal or computing device, a network, and a server.

FIG. 1 is a simplified diagram illustrating system 10 including a browser-enabled computing device or apparatus 12 sending commands "A" by way of the Internet 16 to a server 14. Server 14 responds to the commands by transmitting a response "A" to the command of the same name. As mentioned, the issuance of multiple identical commands from browser-enabled computing device 12 to server 14 can result in undesirable results, as for example the transmission of a plurality of generally similar responses.

Figure 2:
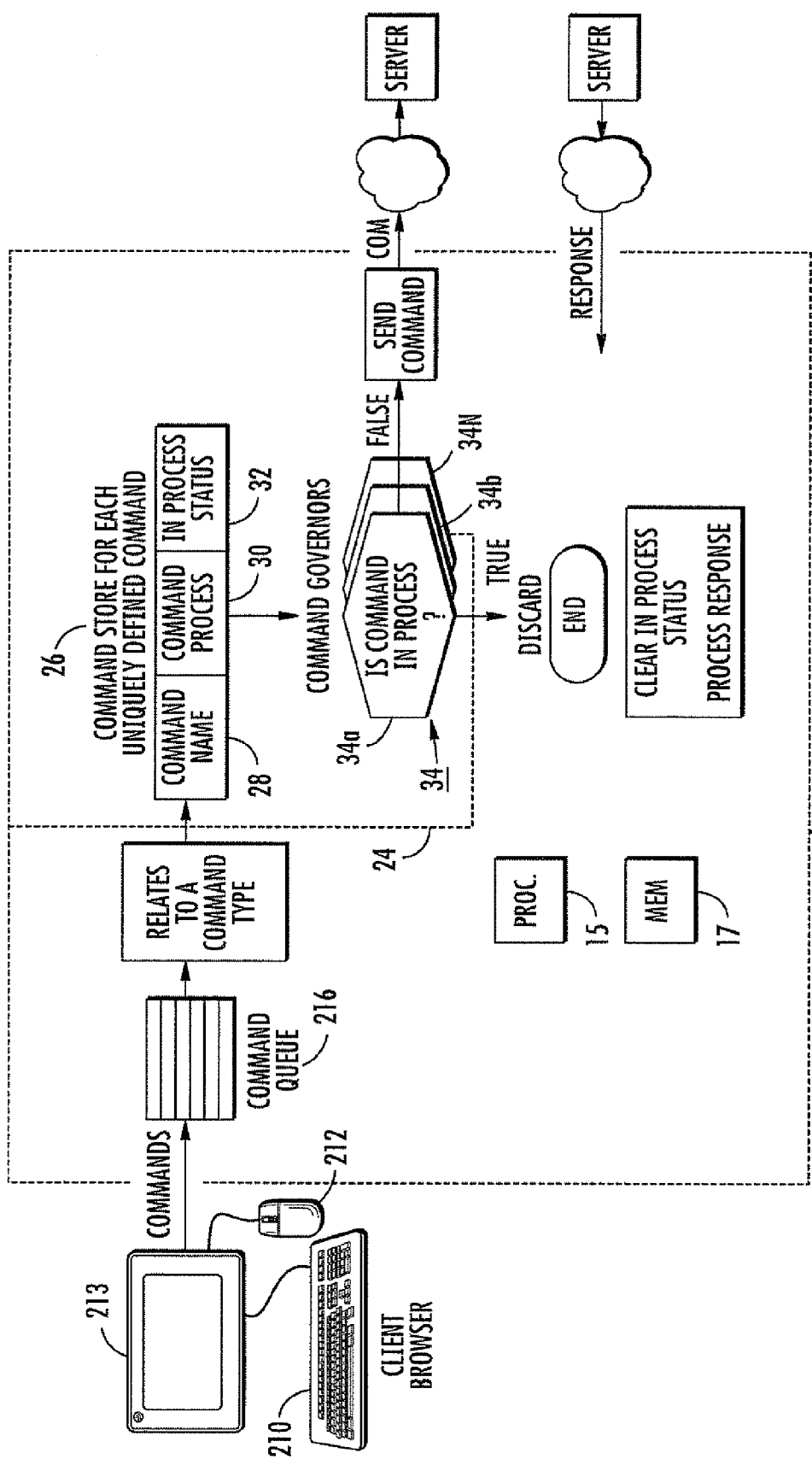
FIG. 2 is a simplified block diagram of the user terminal of FIG. 1.

FIG. 2 is a simplified block diagram illustrating some details of the browser-enabled computing device ("browser") 12 of FIG. 1. In FIG. 2, the computer 12 includes or is associated with entry devices, which are illustrated as being a keyboard 210 and a mouse 212. Browser-enabled computing device 12 includes a processor illustrated as a block 15, which performs the usual command and control functions in conjunction with memory, some of which is illustrated as a block 17. Commands from the entry devices are applied to a command stack or queue 216, and are communicated from the stack on a first-in, first-out basis. Other portions of the arrangement of browser-enabled computing device 12 are described below.

In the absence of the invention, the commands read from the stack 216 would be applied to the browser, and transmitted over the internet to the server. If the stack 216 were to contain multiple commands of the same type or multiple identical commands, as might occur if the user repeated a command believing it had not been recognized or transmitted, the undesirable multiple responses from the server might occur.

Figure 3:
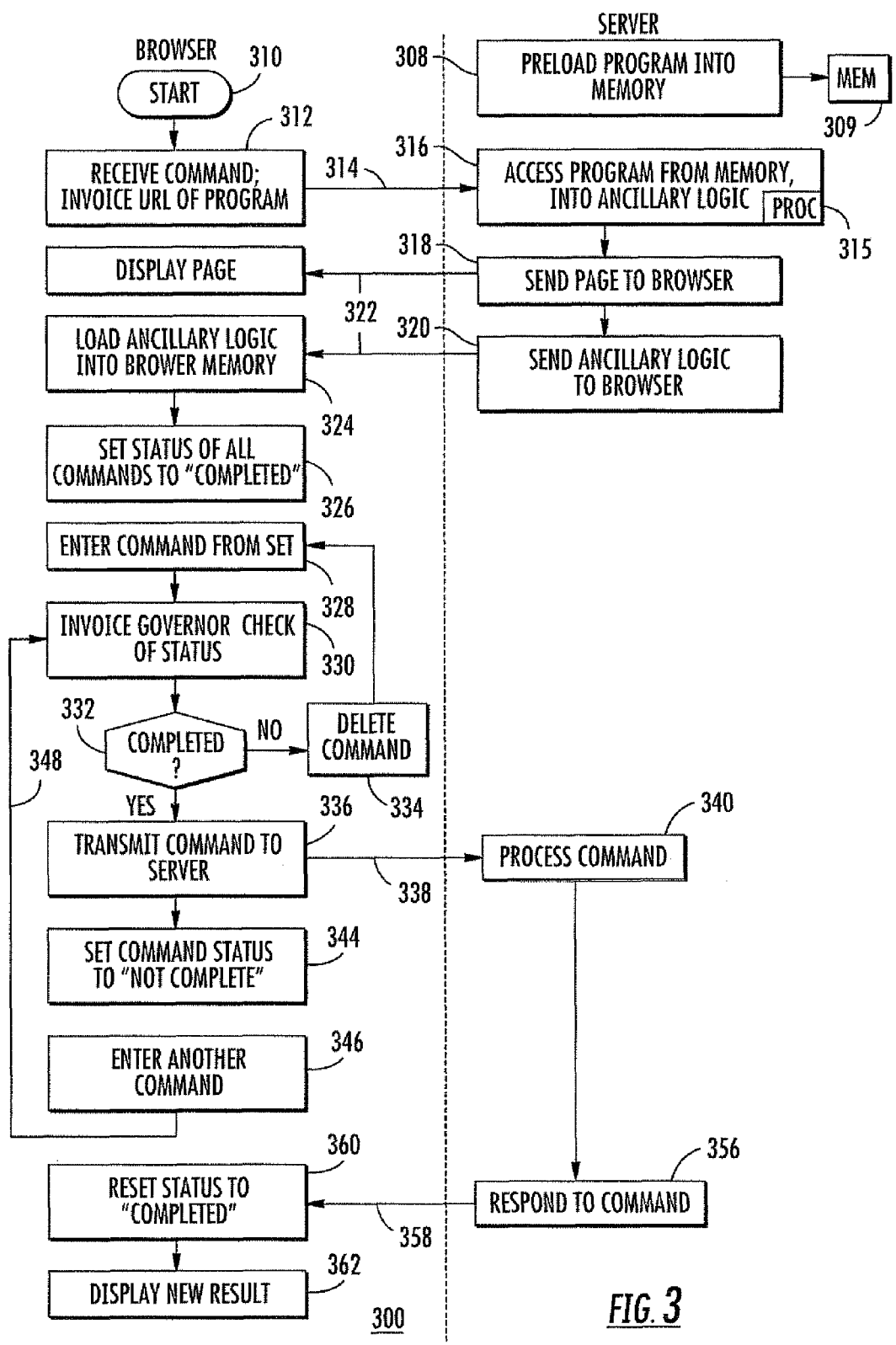
FIG. 3 is a simplified flow chart or diagram illustrating various steps according to various aspects of the invention at the user terminal, at the server, and in the communications between the user terminal and server.
Figure 4:
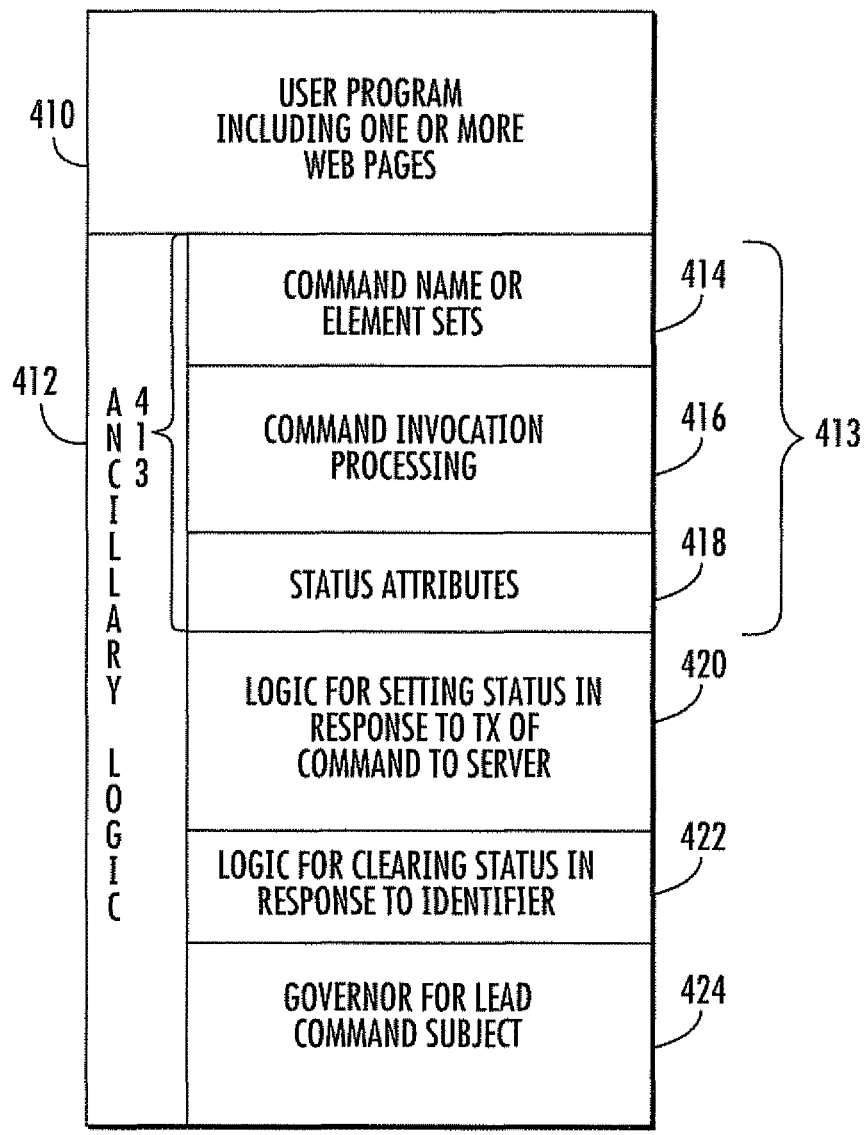
FIG. 4 is a block diagram illustrating a response of the remote server, which includes a page displayable at the browser-enabled device and logic associated with the page according to an aspect of the invention.

According to an aspect of the invention, the server, when invoked to load a browser page in the browser-enabled computing device, also loads ancillary logic into memory of the browser-enabled computing device. The ancillary logic includes one or more governors or limiters, one for each command type within a finite set of commands. The overall operation can be better understood by reference to FIG. 3, which is a functional flow chart illustrating actions at the browser-enabled computing device and at the server which are relevant to the invention. In FIG. 3, steps to the left of dividing line 302 represent or illustrate actions at the browser-enabled computing device, and to the right of line 302 illustrates actions at the server. The logic or flow begins with a START block 310, and flows to a block 312, representing the keying of commands into the browser-enabled computing device, to thereby invoke a selected program stored at the server. This is accomplished by keying a universal resource locator (URL) address. The transmission of the URL to the server is illustrated as a line 314. The URL command, when received by the server, accesses the particular program at the server, as suggested by block 316. At the server, the accessed program is called from memory, and the server produces a web page (block 318) and ancillary logic and data (block 320). The web page and the ancillary data are sent from the server over the internet to the browser, as suggested by lines 322.

In FIG. 3, the web page and ancillary logic are transmitted to the browser and are received by the browser, as suggested by block 324. Block 324 represents display of the web page associated with the program invoked in step 312, and the loading into browser memory of the ancillary logic. The ancillary logic includes (a) a command data element set or first logic element including plural command names, command invocation processing associated with each of the command names, and "not complete" and "completed" status attributes, (b) a second logic element for setting the "not complete" status attribute in response to the sending of a command, (c) defines a third logic element for clearing the "not complete" status of each of the status attributes to "completed" in response to a "completed" message, and (d) defines a plurality of governors, each of which, for a given command name in the command data element, determines if its status is "not complete" or "completed," and if its status is "not complete," deleting the given command, and if its status is "completed," sending the given command. The browser 12 loads the ancillary logic when it is received from the server by way of path 322.

Referring to FIG. 2, the browser 12 is illustrated as including a block 24, which includes memory loaded with the ancillary data and logic. The ancillary data includes a command store block 26, which includes a command name store 28, which stores a set of command names associated with the invoked program. This set of command names will be related to the functions that the server can provide using the invoked program. In a map-displaying program context, for example, the commands might include zoom+ and zoom− functions, and left/right/up/down functions for moving the centering of the displayed map. Each command name is associated with binary structure or command structure required to invoke the named command at the server, and the associated binary structure or command structure is also included, as suggested by block 30. Another piece of ancillary logic is a memory store 32 in which the current status of each type of command can be stored. That is, for example, in the case of the zoom+ and zoom− commands, one would ordinarily not command one of the map zoom functions immediately followed by the contrary map zoom function. Thus, the zoom functions can be viewed or categorized by a single status, either "completed" or "not completed." The memory region associated with in-process status block 32 contains a location for the status of each command type, where a "command type" would be, for example, the overall "zoom" command. In the case in which the invoked program allows fifty commands of five distinct command types, the memory locations of block 32 would allow for "completed" or "not completed" flags or statuses for five different command types.

In addition to loading the command types, as in block 28 of FIG. 2 and the command type status memory block 32 of FIG. 2, browser 12 also loads into memory a set 34 of one or more governors or regulators, one for each command type, as suggested by 34a, 34b, . . . , 34N. A single governor or regulator, such as governor 34a, is used for each command type. That is to say, that in a possible embodiment in which the zoom+ and zoom− commands were available, governor 34a would, in response to either flavor of zoom command, evaluate the current status of the zoom commands to determine if the status is "complete" or "not complete." Each regulator, in response to receipt of a command of its destined type, examines the "complete" or "not complete" status of the command type. If the status of the command type is "complete," the regulator allows the command to go on to be transmitted to the server so as to invoke the process of the command. On the other hand, if the status of the command type is "not complete," the command is discarded by the regulator. The duplicative-type command which is discarded by the appropriate regulator cannot be transmitted from the browser to the server, and cannot be placed in a memory stack of the server so as to result in undesired repetitive functions.

Returning now to FIG. 3, the loading of the command data types and other information, and the loading of the governor logic into the browser, is represented by block 324. From block 324, the logic 300 of FIG. 3 flows to a block 326, which represents the setting of all the command status flags to "completed," since at this first iteration through the logic the commands have just been defined, and it was not previously possible to select a command from the command set. This setting of the flags allows the first command of the set to flow to the server unimpeded.

At some later time, the user of the browser will enter one of the commands of the set of commands allowable or defined by the invoked program and appearing in the set of commands listed in block 28 of FIG. 2. This entering of a command is represented by a block 328 of FIG. 3. From block 328 the logic of FIG. 3 flows to a block 330, which represents the invocation of the particular governor associated with the command type. From block 330, the logic of FIG. 3 flows to a decision block 322, which represents the decision made by the relevant governor about the status of the command type. If the command type is not "completed," the logic leaves decision block 322 by the NO output, flows to a block 334 representing deletion of the command, and returns to block 328 to await the next command. On the other hand, if the command status is "completed," the logic leaves decision block 332 by the YES output, and flows to a block 336. Block 336 represents the sending of the command to the server. The command is sent to the server, as suggested by line 338, and block 340 represents the processing of the command at the server.

From block 336 of FIG. 3, the logic flows to a block 344, which represents the resetting of the status of the command, as seen at the browser, to "not complete." The status remains "not complete" until such later time at which a response to the command is received at the browser, together with a command type response identifier. Block 346 represents the possibility that the user of the browser of the browser-enabled computing device will wish to enter another command, whereupon the logic returns by a logic path 348, to again invoke a governor for the new command. As mentioned, the command may be of the same type as the previous command, in which case the governor will delete the command, or it may be of a different type, which undergoes the same review by a different governor, and which may or may not be deleted, depending upon the status of the particular command type.

As mentioned, block 340 of FIG. 3 represents the receipt by the server of a particular command. Block 356 represents the eventual response by the server to the command. The response is transmitted (line 358) to the browser, where it is received, together with the command type response identifier. Response identifiers are known in the art, and making them responsive to command type is well within the abilities of a person skilled in the art. A block 360 is invoked by the response arriving at the browser. Block 360 at the browser represents resetting of the previous "not completed" status to "completed" for this command type. From block 360, the logic flows to a block 362, which represents the display of the substantive aspects of the server response to the command.

The server is unchanged from the prior art, except for the identification of the response identifier to the various types of commands of the set of the invoked program. This information is available in server memory together with the invoked program and the ancillary data and logic.

While the browser-enabled computing device or user terminal is described as being connected to the server by way of the Internet, the connection may be a direct connection, or it may be by way of any network, so the description and claims should be interpreted in this light.

A method according to an aspect of the invention is for reducing the repetition of server (14) actions in response to repeated identical commands from a browser-enabled computing apparatus (12) communicating with the server (14). The method comprises the step of providing a server (14) apparatus identified on the Internet (16) with a universal resource locator address (URL), the server (14) including a server (14) processor (315) and a server (14) memory (309), which server (14) memory is preloaded with at least one user program (410) and accessory logic (412) therefor. The accessory logic (a) defines a command data element set or first logic element (414) including plural command names, command invocation processing (416) associated with each of the command names, and "not complete" and "completed" status attributes (418), (b) defines a second logic element (422) for clearing the "not complete" status of each of the status attributes to "completed" in response to a "completed" or response identifier message, and (c) defines a plurality of governors (34a, 34b, etc; 422), each of which, for a given command name in (from among those in) the command data element, determines if its status is "not complete" or "completed," and if its status is "not complete," deleting the given command, and if its status is "completed," sending the given command. The method also includes the provision of a browser-enabled computing apparatus (12) including a processor (15), a memory (including 17 and 26), a data entry device (210/212), and a display device (213). The server (14) is accessed from the browser-enabled computing apparatus by way of the universal resource locator (URL) and the Internet (16), and the user program at the server (14) apparatus is invoked. At the server (14), in response to being accessed by the browser-enabled computing apparatus (12) and having the user program (410) invoked, the server (14) processor (315) is used to access the user program (410) and the accessory logic (412) from server (14) memory (309). Using the server (14) processor (309), a web page associated with the user program (410) is transmitted to the browser-enabled computing device (12) by way of the Internet (16), together with the accessory logic (414). A status clear instruction may also be sent. At the browser-enabled computing device (12), the processor (15) of the browser-enabled computing device (12) is used to load the page and the auxiliary logic into browser memory (26), and to display the page on the display device (213). Using the data entry device (210/212), one of the commands from among the command names is generated or invoked, and the one of the commands is applied to the processor (15) of the browser-enabled computing device (12). The governor acts on the command in one of its manifestations, preferably on the command as it would be transmitted but for the action of the governor. In response to the one of the commands applied to the processor of the browser-enabled computing device (12), the current "not complete" or "completed" status of the command is accessed from the memory (17, 25) of the browser-enabled computing device. The corresponding one of the governors (34a. 34b. etc) is invoked by the processor of the computing device to delete the one command if its status is "not complete," and to send the one command on to the server (14) if its status is "completed."

According to another aspect of the invention, the server (14) memory (309) is loaded with a further logic element associated with the accessory logic (412). The further logic element (422) responds to the sending of a response (the response identifier) from the server (14) to the browser-enabled computing device in response to receipt by the server (14) of one of the named commands. The further logic element responds to the sending of a "completed" or response identifier message to the browser-enabled computing device by changing the status from "not complete" to "completed."

A method according to another aspect of the invention is for reducing the repetition of server (14) actions in response to repeated identical commands from a remote browser-enabled computing device (12). The method comprises the step of, at a browser-enabled computing device (12), accessing (314, 316) a program (410) at a remote server (14) by way of the internet (16). The remote server (14), in response to being accessed by the browser-enabled computing device (12), loads the selected program (410), and transmits to the browser-enabled computing device (12) a page together with logic (412). The logic (412) (a) defines a command data element (413) including a command name (414), command invocation processing (416) for each command name, and status attributes (418), (b) defines a logic element (420) for setting the status of a status attribute to "not complete" in response to transmission of a command from the browser-enabled computing device to the server (14), (c) defines a logic element (422) for clearing the "not complete" status of each of the status attributes to "completed" in response to a "completed" or response identifier message from the server (14), and (c) defines a plurality of governors (424), each of which governors (34a, 34b, etc), for a given command name in the command data element (413), determines if its status is "not complete" or "completed," and if its status is "not complete," deleting the given command, and if its status is "completed," sending the given command to the server (14).

A particular mode of this method includes the further step, at the browser-enabled computing device (12), in response to receipt from the server (14) of the page together with logic, displays the page, and loads the logic into memory (17, 26) of the browser-enabled computing device (12).

In one mode of operation of this particular mode of the method, a selected one of the commands is invoked at the browser-enabled computing device (12), and is commanded to be sent to the server (14). In that one of the governors (34a, 34b, etc.) associated with the name of the selected one of the commands, the current status of the selected one of the commands is determined, and the selected one of the commands is deleted if the status is "in process," and the selected one of the commands is sent on for transmission to the server (14) if the status is "completed." The status of the selected one of the commands is changed to "not complete" in response to the sending of the selected one of the commands to the server (14). In response to a command from the browser-enabled computing device (12) to the server (14), the command is responded to by transmitting at least a response identifier from the server (14) to the browser, and in response to receipt of the response identifier at the browser, the status of the relevant command type is reset to "completed."

What is claimed is:

1. A method for reducing the repetition of server actions in response to repeated identical commands from a remote browser-enabled computing device, said method comprising the steps of:
   sending a request to a remote server from the browser-enabled device;
   responsive to the request to the remote server, receiving at the browser-enabled device, a page displayable at the browser-enabled device, and logic associated with the page, the logic including a set of commands, each command in said set of commands having a status of completed or not-complete, and a governor for each command of the set of commands, the governor configured to determine the status of an associated command;
   entering a command from the set of commands at the browser-enabled computing device;
   responsive to the entered command, determining by the governor associated with the command in a computer process at the browser-enabled computing device, whether the status of the command is set to completed or not complete; and
   in a computer process at the browser-enabled computing device, deleting the command prior to sending the command to the server, if the status of the command is set to not complete.

2. The method of claim 1, further comprising the step of, at the browser-enabled computing device, sending the command to the server if the status of the command is set to completed.

3. The method of claim 1, further comprising the step of setting in a computer process at the browser-enabled computing device, the status of the command to not complete.

4. The method of claim 3, further comprising the step of receiving from the server, a response in reply to the command sent by the browser-enabled computing device.

5. The method of claim 4, further comprising the step of setting, at the browser-enabled computing device, based on receipt of the response from the server, the status of the command to completed in a computer.

6. The method of claim 2, further comprising the step of receiving from the server, a response in reply to the command sent by the browser-enabled computing device.

7. The method of claim 1, wherein before the step of entering a command at the browser-enabled computing device, further comprising the steps of:
   at the browser-enabled computing device, accessing a program at the remote server;
   at the remote server, in response to being accessed by said browser-enabled computing device, loading at the browser-enabled device, the accessed program and transmitting to said browser-enabled computing device a page together with logic defining the command, the completed and not complete statuses of the command, and a governor for performing the determining step.

8. The method of claim 1, wherein the governor further performs the deleting step.

9. The method of claim 1, wherein the governor further performs the command sending step.

10. The method of claim 7, wherein at the browser-enabled computing device, further comprising the steps of:
    displaying the page; and
    loading the logic.

11. The method of claim 7, wherein before the step of entering a command at the browser-enabled computing device, further comprising the step of setting the status of the command to completed.

12. A system comprising:
    a server; and
    a browser-enabled computing device for communicating with the server, the browser-enabled computing device including a processor executing instructions for:
       sending a request to a remote server from the browser-enabled device;
       responsive to the request to the remote server, receiving at the browser-enabled device in response to said sent request, a page displayable at the browser-enabled device, and logic associated with the page, the logic including a set of commands, each command in said set of commands having a status of completed or not-complete, and a governor for each command of the set of commands, the governor configured to determine the status of an associated command;
       prior to sending a command to the server, determining at the browser-enabled device, whether the status of the command invoked at the browser-enabled computer device is set to completed or not complete; and
       deleting, at the browser-enabled device, the command if the status of the command is set to not complete.

13. The system of claim 12, wherein the processor executes further instructions for sending the command to the server if the status of the command is set to completed.

14. The system of claim 13, wherein the processor executes further instructions for setting the status of the command to not complete after sending the command to the server.

15. The system of claim 14, wherein the server includes a processor executing instructions for sending a response to the browser-enabled computing device in reply to the command.

16. The system of claim 15, wherein the processor of the browser-enabled computing device executes further instructions for setting the status of the command to completed.

17. The system of claim 13, wherein the server includes a processor executing instructions for sending a response to the browser-enabled computing device in reply to the command.

18. A browser-enabled computing device for communicating with a server, the browser-enabled computing device comprising:
- a processor executing instructions for:
    - sending a request to a remote server from the browser-enabled device;
    - responsive to the request to the remote server, receiving at the browser-enabled device in response to said request, a page displayable at the browser-enabled device, and logic associated with the page, the logic including a set of commands, each command in said set of commands having a status of completed or not-complete, and a governor for each command of the set of commands, the governor configured to determine the status of an associated command;
    - determining whether the status of a command entered at the browser-enabled computing device is set to completed or not complete, prior to sending the command to the server; and
    - deleting the command prior to sending the command to the server if the status of the command is set to not complete.

19. The browser-enabled computing device of claim 18, wherein the processor executes further instructions for sending the command to the server if the status of the command is set to completed.

20. The browser-enabled computing device of claim 19, wherein the processor executes further instructions for setting the status of the command to not complete after sending the command to the server.

21. The browser-enabled computing device of claim 20, wherein the processor executes further instructions for setting the status of the command to completed in reply to a response received from the server in reply to the command.

22. The browser-enabled computing device of claim 19, wherein the processor executes further instructions for setting the status of the command to completed.

23. A method for reducing the repetition of server actions in response to repeated identical commands from a remote browser-enabled computing device, said method comprising the steps of:
- sending a request to a remote server from the browser-enabled device;
- responsive to the request to the remote server, receiving at the browser-enabled device, a page displayable at the browser-enabled device, and logic associated with the page, the logic including a set of commands, each command in said set of commands associated with a command type, the command type having a status of completed or not-complete, and a governor for each command type, the governor configured to determine the status of an associated command type;
- invoking a command at the browser-enabled computing device;
- identifying, in a computer process at the browser-enabled computing device, the command type for the invoked command;
- determining in a computer process at the browser-enabled computing device, whether the status of the command type is set to completed or not complete; and
- deleting at the browser-enabled computing device prior to sending the command to the server, the command in a computer process if the status of the command type is set to not complete.

\* \* \* \* \*